(12) United States Patent
Jin et al.

(10) Patent No.: US 7,988,048 B2
(45) Date of Patent: Aug. 2, 2011

(54) CONTROL CHIP OF A CARD READER AND METHOD FOR DETECTING INTERFERENCE THEREOF

(75) Inventors: Zhong Jin, Jiangsu Province (CN); Chih-Ching Chien, Hsinchu County (TW); Li-Cong Hou, Jiangsu Province (CN)

(73) Assignee: Realtek Semiconductor Corp., Hsinchu (TW)

( * ) Notice: Subject to any disclaimer, the term of this patent is extended or adjusted under 35 U.S.C. 154(b) by 490 days.

(21) Appl. No.: 12/048,473

(22) Filed: Mar. 14, 2008

(65) Prior Publication Data

US 2008/0257960 A1    Oct. 23, 2008

(30) Foreign Application Priority Data

Mar. 16, 2007   (TW) ............................... 96109232 A

(51) Int. Cl.
*G06K 7/06* (2006.01)
*G06K 7/08* (2006.01)
*G06K 19/06* (2006.01)

(52) U.S. Cl. ........ 235/441; 235/375; 235/380; 235/451; 235/486; 235/492

(58) Field of Classification Search .................. 235/441, 235/451, 486, 492
See application file for complete search history.

(56) References Cited

U.S. PATENT DOCUMENTS

| | | | |
|---|---|---|---|
| 6,845,438 B1* | 1/2005 | Tanaka et al. | 711/206 |
| 2001/0039632 A1* | 11/2001 | MacLaren et al. | 714/6 |
| 2003/0116624 A1* | 6/2003 | Chen | 235/441 |
| 2003/0154326 A1* | 8/2003 | Tseng et al. | 710/1 |
| 2005/0036397 A1* | 2/2005 | Yeh et al. | 365/232 |
| 2005/0258243 A1* | 11/2005 | Hsieh | 235/441 |

* cited by examiner

*Primary Examiner* — Thien M. Lee
*Assistant Examiner* — Tuyen K Vo
(74) *Attorney, Agent, or Firm* — Thomas, Kayden, Horstemeyer & Risley, LLP

(57) ABSTRACT

A control chip of a card reader providing at least one card detection pin for detecting memory cards connected to corresponding read/write interfaces. The card detection pin is for the prevention of mutual interference caused by the memory cards connected with shared pins of the control chip. The card detection pin of the memory card may be used for the detection of another memory card being inserted into or pulled out from a read/write interface when the control chip of the card reader is accessing a memory card. An interference-acknowledgement signal is generated for the prevention or correction of accessing errors.

19 Claims, 6 Drawing Sheets

CONTROL CHIP OF A CARD READER AND METHOD FOR DETECTING INTERFERENCE THEREOF

BACKGROUND OF THE INVENTION

1. Field of the Invention

The present invention relates to a control chip of a card reader, and more particularly to the control chip and the detecting method capable of detecting the interference among the memory cards sharing the pins of the card reader.

2. Description of Related Art

Simple designs are preferably used in conventional multiple card readers, among which most adopt respective read/write interfaces for all types of memory cards. Another approach is to provide common pins for the memory cards, reducing the size of an IC package with fewer pins. Nevertheless, only one memory card can be inserted for accessing data at one time, since the interference of the common pins may corrupt data or cause failure when data is being accessed.

Reference is made to FIG. 1, which shows a block diagram of a multiple card reader with respective interfaces for different memory cards. The pin used for a multiple card reader is coupled to a CF card/Micro Drive card read/write interface 11, a SM card/xD-Picture card read/write interface 12, a SD card/MMC card read/write interface 13 and a MS card/MS Pro card read/write interface 14. Since common pins are not adopted in conventional read/write interfaces of the control chip 1, there will be no interference in this case. This design, however, needs more pins for each package and thus more cost.

FIG. 2 shows a block diagram of a multiple card reader adopting common pins for nearly all types of memory cards. The pins of the card reader control chip 2 are jointly used by the CF card/Micro Drive card read/write interface 21, SM card/xD-Picture card read/write interface 22, SD card/MMC card read/write interface 23, and MS card/MS Pro card read/write interface 24. There are several ways to implement such common pins, whereas their purpose is mainly for the sake of reducing cost. Since the interference caused by the common pins are not solved in conventional designs, only one memory card can be inserted for accessing data at one time in conventional multiple card readers. An all-in-one socket may be applied by mechanical limitations so that only one memory card can be inserted at one time.

If the interference is ignored, unexpected results leading to malfunction may occur. For example, if several cards are inserted at the same time, the card reader control chip 2 may fail to access a first memory card if a second memory card is inserted into or pulled out from one of the memory card read/write interfaces. Furthermore, if the incident occurred while the first memory card is undergoing a read/write process, data errors that are read or written may happen due to the interference.

Although the card reader shown in FIG. 2 lessens the package cost and is compatible with many types of the memory cards, the disadvantage that only one memory card can be accepted by the card reader at a time is still a major drawback. This is especially true when at least two memory cards are to be used for transmitting data with other.

SUMMARY OF THE DISCLOSURE

In view of the conventional drawbacks, an object of the present invention is to provide a control chip of a card reader that has different memory card read/write interfaces sharing the pins thereof. The claimed control chip can reduce the package cost. Particularly, the control chip can detect possible interference among the memory cards in an earlier stage due to the memory card read/write interface that shares the pins of the control chip. An adequate action will thereby be executed and the interference will be acknowledged in advance.

In order to reduce the package cost and acknowledge the interference in an earlier stage, the present invention provides a card reader control chip having the pins shared by memory card read/write interfaces. In particular, the card reader control chip includes detection pins, which respectively couple to the pins of the memory card read/write interfaces. The pins coupled to the detection pins are the pins of the memory card read/write interfaces that first contact with the memory cards. Moreover, the card reader control chip utilizes the detection pins to detect if any memory card is inserted into one of the memory card read/write interfaces.

The present invention further provides a method for detecting the interference of the card reader control chip. The pins of the control chip are provided for the common use by the memory card read/write interfaces. The method includes a first step of providing at least one detection pin of the card reader control chip, the detection pin being used to detect if any memory card is inserted into one of the memory card read/write interfaces. In which, the detection pin is coupled to one of the pins of the memory card read/write interfaces that first contacts with the memory card. After that, an interference-acknowledgement signal will be generated if there happens to be another memory card inserted into one of the memory card read/write interfaces for processing data transmission and is detected by the control chip through the detection pin.

To achieve the foregoing objectives, the card reader control chip and the method for detecting interference of the present invention will provide efficient and advance interference detections. An adequate approach for the elimination of error and interference is provided such that the restriction of only one memory card will no longer exist in card reader control chips that share common pins.

The present invention will become more fully understood from the detailed description given herein below and the accompanying drawings which are given by way of illustration only, are not in any way intended to limit the scope of the claims of the present invention.

BRIEF DESCRIPTION OF DRAWINGS

The foregoing aspects and many of the attendant advantages of this invention will be more readily appreciated as the same becomes better understood by reference to the following detailed description, when taken in conjunction with the accompanying drawings, wherein.

DETAILED DESCRIPTION OF THE PREFERRED EMBODIMENTS

The present invention is illustrated with preferred embodiments and drawings. However, the invention is not intended to be limited thereby.

In order to reduce cost, an IC package with fewer pins is adapted to share pins among memory card read/write interfaces of two or more memory cards. However, if the card reader provides access to two or more memory cards at the same time, the memory card read/write interfaces may interfere due to the shared pins.

The card reader control chip of the present invention will be able to detect the above-mentioned interference effectively in an earlier stage. And in particular, an error correction approach is introduced through this interference detective mechanism, which will solve the error that may occur during the access of the memory cards.

Figure 1:
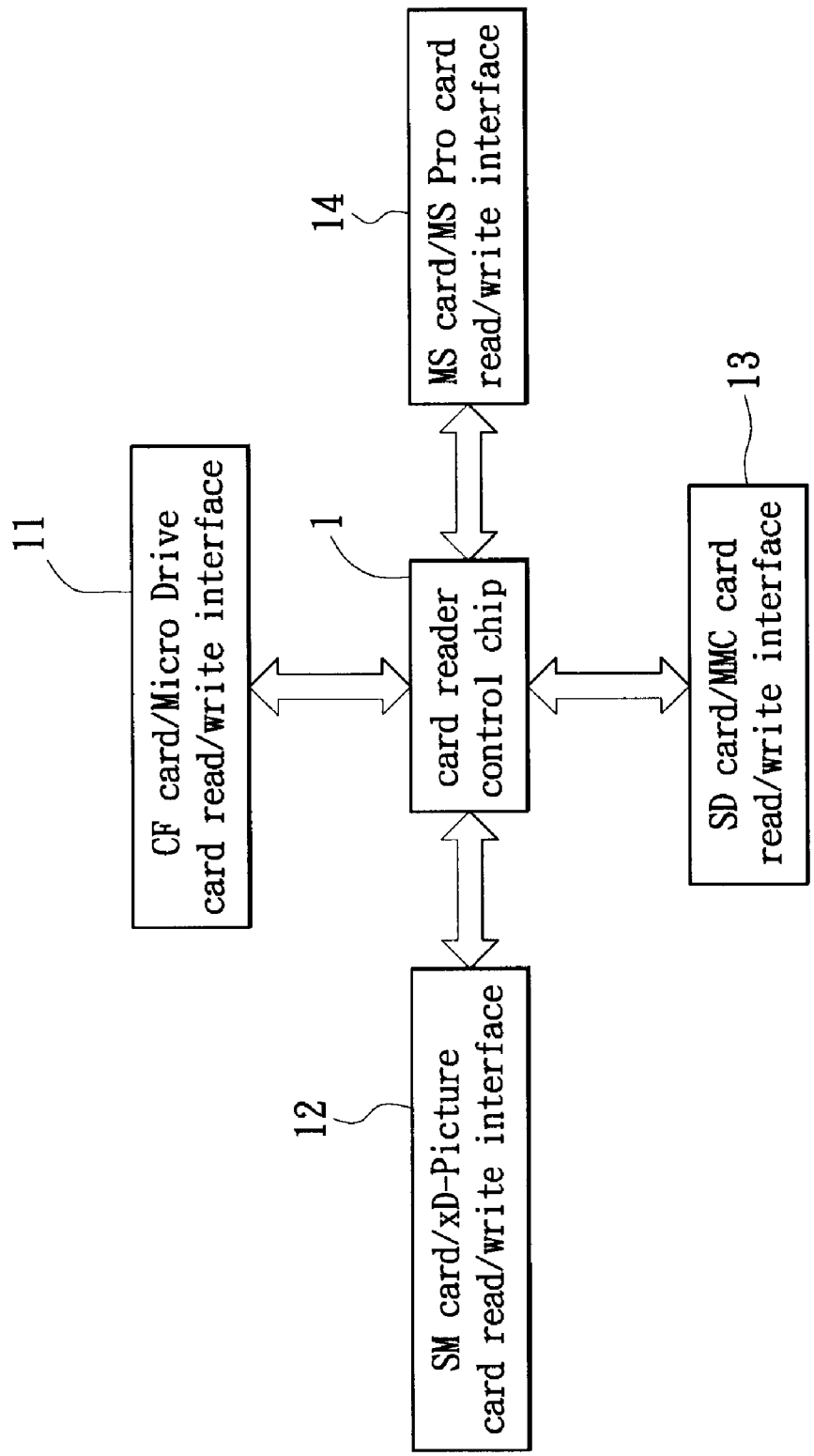
FIG. 1 is a schematic diagram of a multiple card reader control chip with separate pins.
Figure 2:
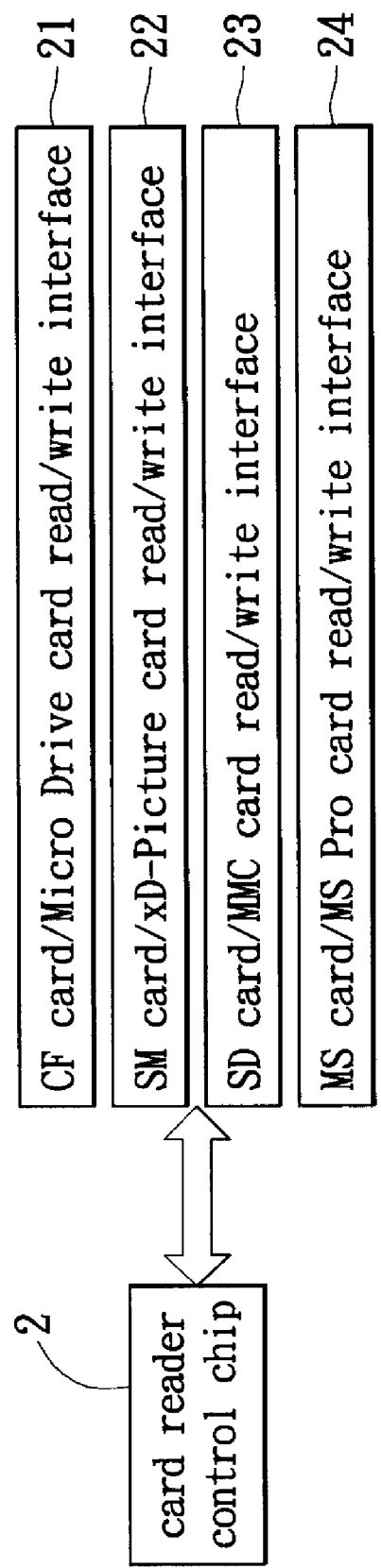
FIG. 2 is a schematic diagram of a multiple card reader control chip with common pins.
Figure 3:
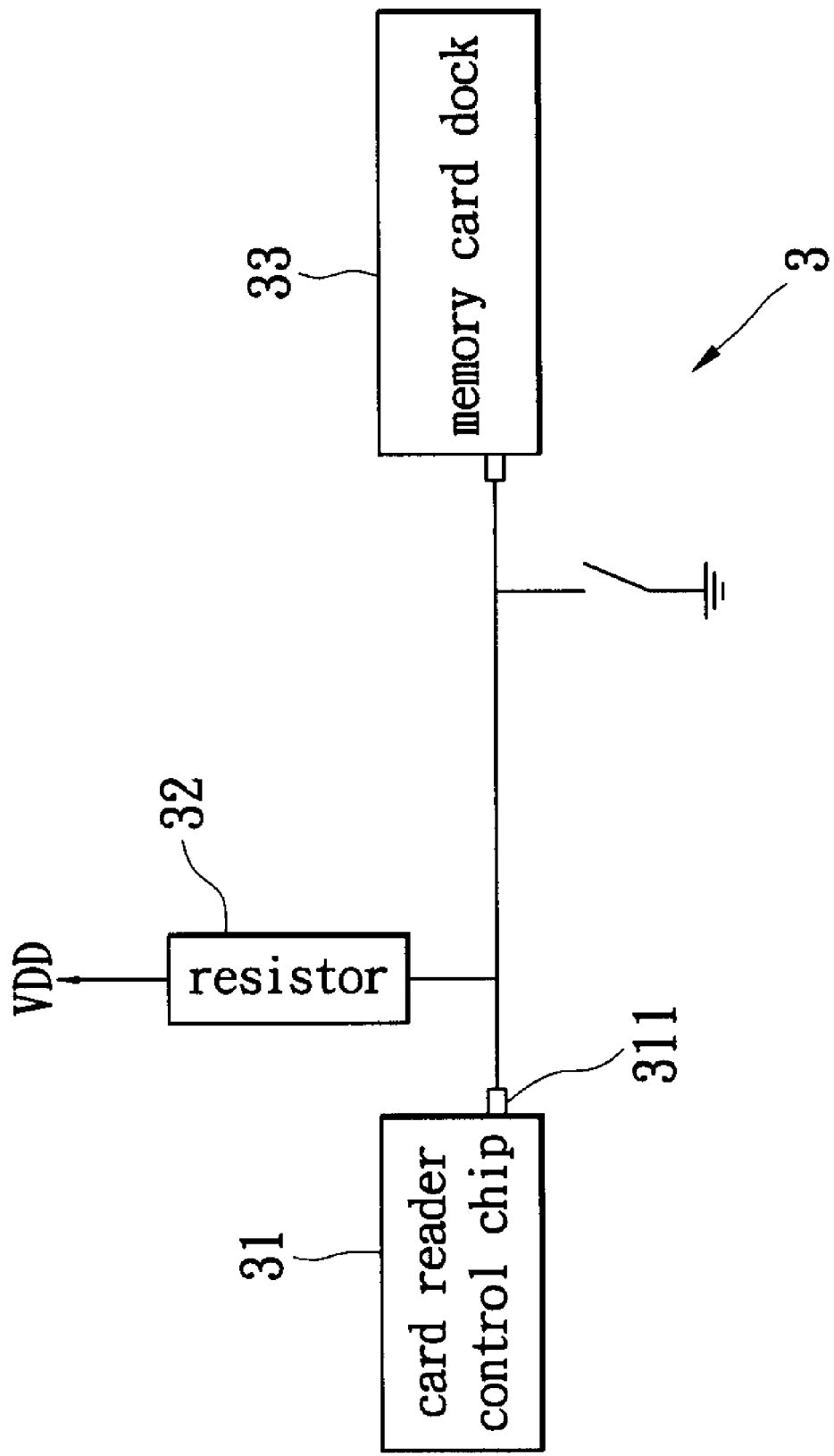
FIG. 3 shows a schematic diagram of the card detection pins of a card reader control chip.

Current types of the memory cards often used in the market include Compact Flash (CF) card, Micro Drive (MD) card, Secure Digital (SD) card, Multi-Media Card (MMC) card, Memory Stick Pro (MS-Pro) card, and xD-Picture card. Memory cards above provide a card detection pin. Reference is made to FIG. 3, which shows a block diagram of a card detection pin of a card reader control chip. A voltage level change at the card detection pin 311 of the control chip 31 is used as an indicator to determine whether the memory card is inserted into or pulled out from a memory card read/write interface of a card reader 3, such as the memory card dock 33 shown in FIG. 3. A pull up resistor 32 is coupled in between a power source VDD and a card detection pin 311. If there is no memory card inserted into the dock 33, the control chip 31 will detect a voltage level of logic high at the card detection pin 311. If there is a memory card inserted into the dock 33, a logic low will be detected since the card detection pin 311 is shorted to a ground voltage. That is, if the memory card is pulled out, the voltage level detected at the card detection pin 311 changes from logic low to logic high. The card reader control chip 31 can detect whether the memory card is still in the dock by means of the voltage change at the card detection pin 311. There are several ways to short the card detection pin 311 to ground based on memory card types. Some short the card detection pin 311 to ground according to electrical properties, whereas some accomplish such efforts through mechanical designs of the dock 33. It should be noted that according to different design requirements, the pull up resistor 32 may be kept inside the card reader control chip 31, or left outside by using a resistance element.

According to the above statement, the card reader control chip 31 is coupled to a memory card by means of a memory card dock 33. Although the docks used may have different mechanical designs, their concepts are substantially the same. That is, when memory cards are inserted into their corresponding docks, corresponding card detection pins are always the last metal contacts to the memory card docks. Therefore, the pins other than the card detection pin are to be coupled with the control chip of the card reader before detecting that a memory card is inserted into the dock. This assures that all pins of the memory card are coupled to the control chip when the control chip starts to communicate with the memory card.

Figure 4:
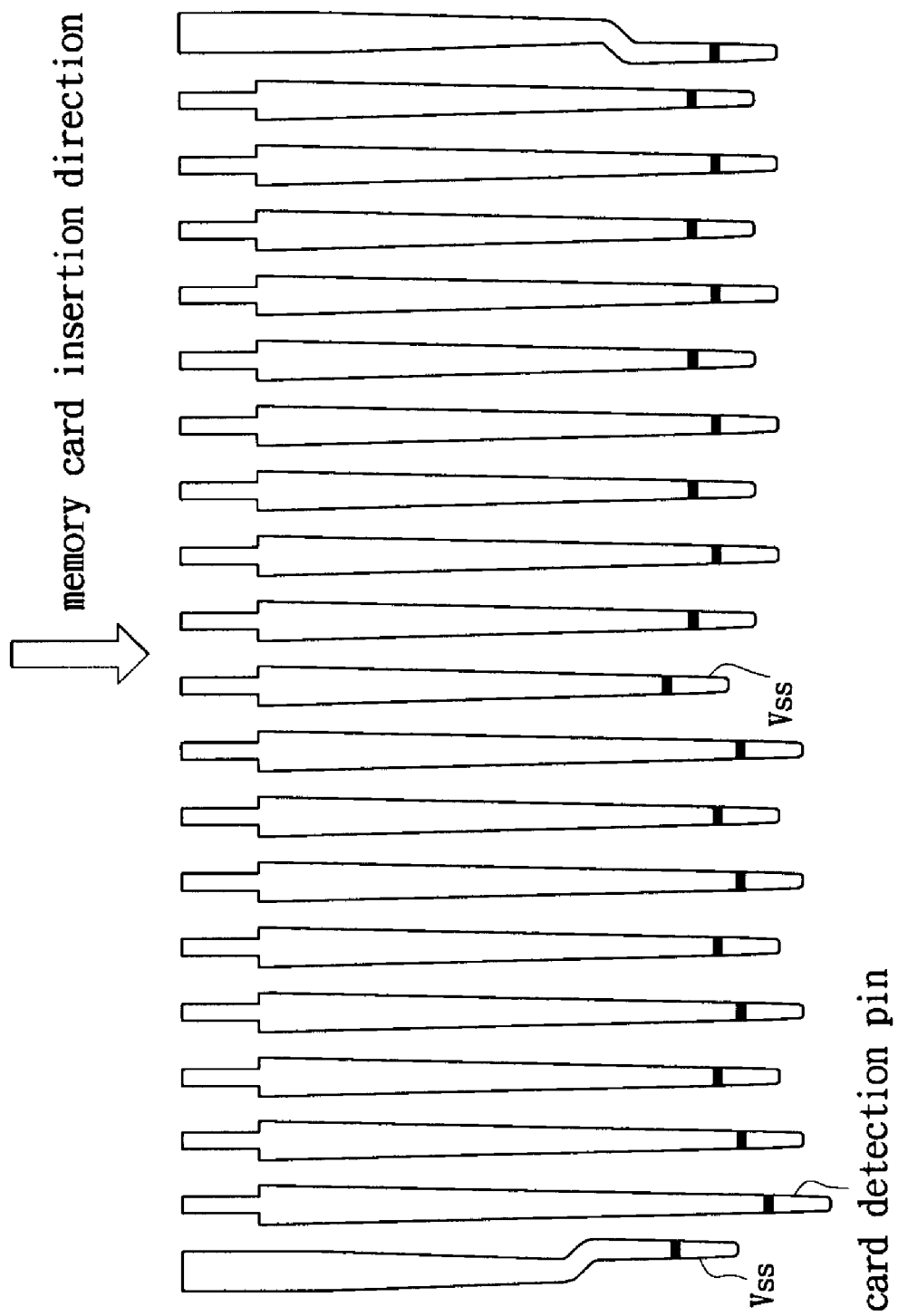
FIG. 4 is an exemplary schematic diagram of the dock for an xD-Picture card.

Reference is made to FIG. 4, which shows a schematic diagram of an xD-Picture card dock. The locations with labeled thick-line are the contacts of the memory card dock as the xD-Picture memory card is inserted into or pulled out from the dock. FIG. 4 shows that the card detection pin of the card reader control chip is the last pin that contacts with the xD-Picture memory card through the dock. It should be noted that the docks used for other kinds of memory cards shall follow similar rules.

When the shared pins of the control chip are used for communicating with a first memory card in a memory card dock, error may occur when a second memory card is inserted into another dock. Since pins other than the card detection pin of the second memory card will come in contact with the control chip before the card detection pin comes in contact with the control chip, it would be too late for any error correction approach by the time the control chip actually detects the insertion of the second memory card. The insertion of the second memory card thereby influences data access of the first memory card, which induces possible errors regarding different types of memory cards when jointly in use of pins.

Therefore, to rely on the card detection pin would be insufficient to solve the aforementioned problem. An embodiment of the present invention suggests providing at least two supply voltage grounds (Vss), wherein one of the supply voltage grounds is used as another card detection pin. According to typical designs of the dock of memory cards along with corresponding specifications, the Vss pin is the pin that first contacts the dock when a memory card is inserted. Therefore, by using this feature, the control chip of the card reader can detect ahead of time that a memory card is inserted into the dock. The control chip will then be able to react and perform error correction at an earlier time since other pins of the memory card are not yet in contact with the control chip of the card reader.

Figure 5:
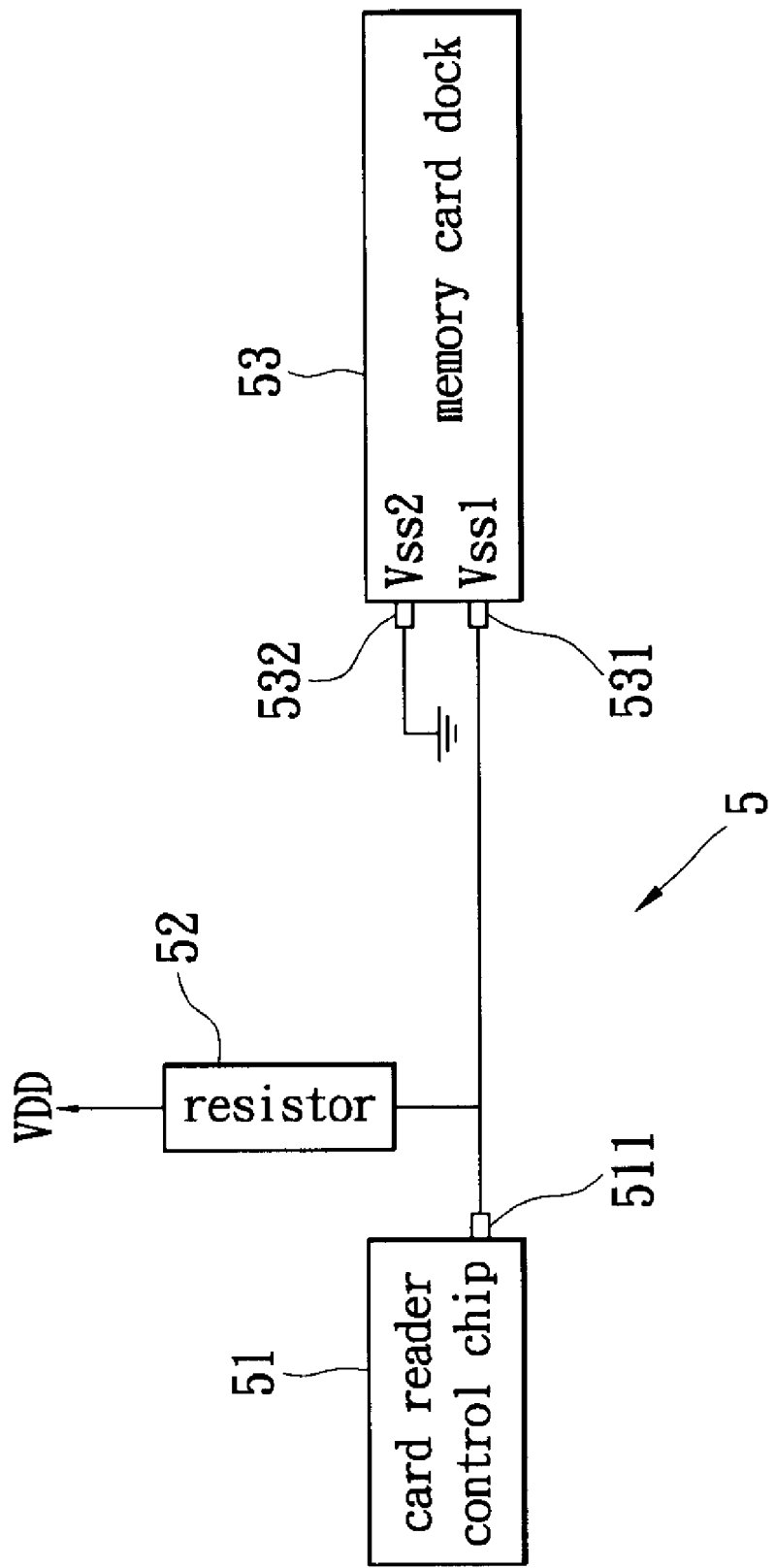
FIG. 5 shows a schematic diagram of a newly added card detection pin of the card reader control card.

Reference is made to FIG. 5, which shows a schematic diagram of a new card detection pin added to the control chip of the card reader. Based on the aforementioned feature, a first detection pin 511 is newly added to couple to a first ground pin (Vss1 ground pin) 531 of a memory card dock 53. Next, the circuitry of a pull up resistor 52 to power source VDD is used to detect a signal Vss1 of a memory card. A second ground pin (Vss2 ground pin) 532 is coupled to a power ground as illustrated in the systematic circuit of the card reader 5, in which the Vss1 and Vss2 are short-circuited to an equal voltage level within the memory card. When a memory card is inserted into the memory card dock 53, the Vss2 of the memory card will be coupled to the power ground through the second ground pin 532, bringing the voltage level of the first detection pin 511 to logic 0 from logic 1. Nevertheless, the voltage level of the first detection pin 511 will change back to logic 1 from logic 0 as the memory card is pulled out from the dock 53. Since the Vss2 remains coupled to the power ground when the memory card is pulled out from the dock 53, instability or other problems concerning the use of memory cards will not be generated.

Figure 6:
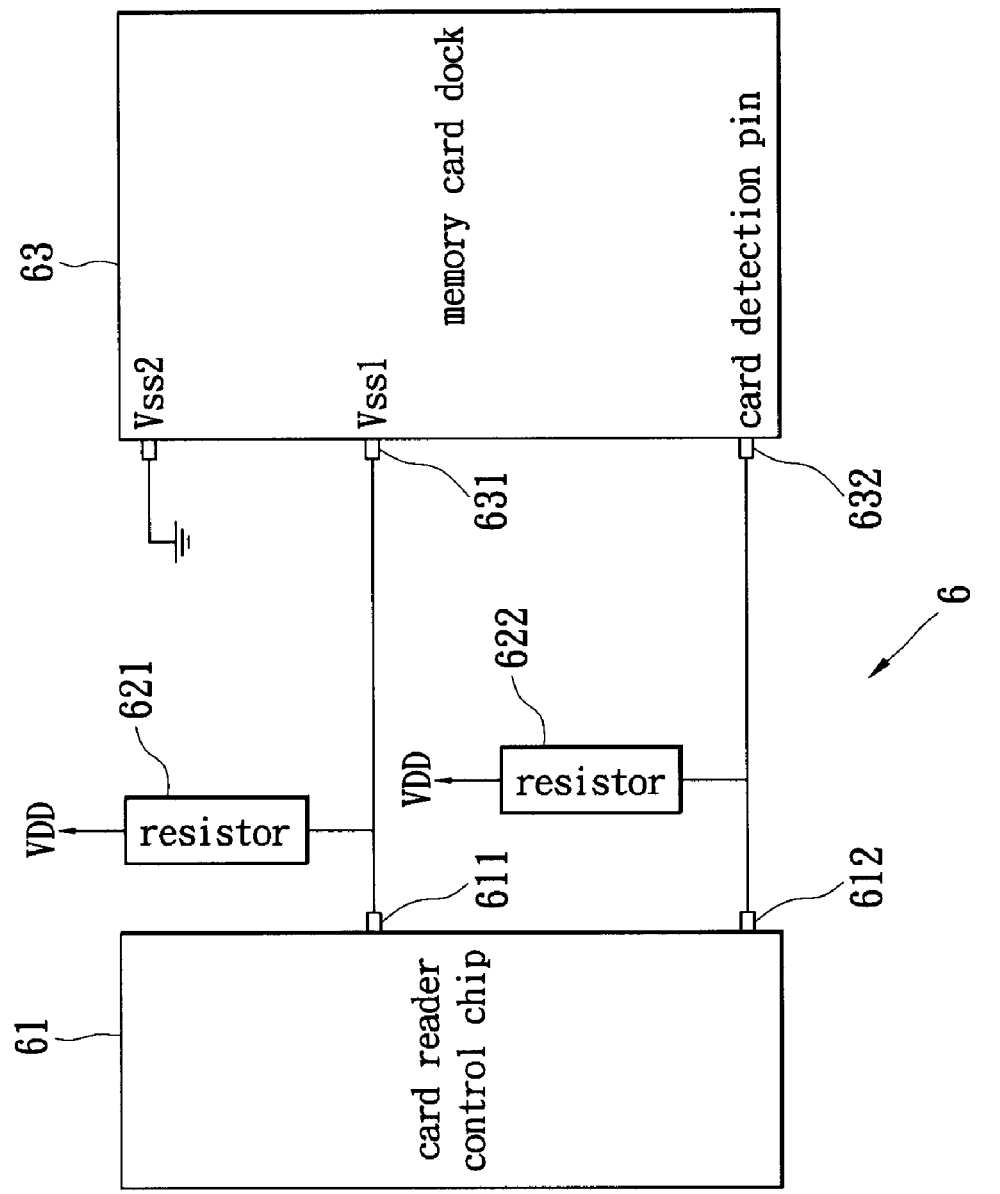
FIG. 6 is a schematic diagram of a preferred embodiment of the card reader control chip of the present invention.

Reference is made to FIG. 6, which shows a preferred embodiment of the card reader control chip of the present invention. Signal pins of several memory cards may share the pins of the card reader control chip 61. The control chip 61 provides a first detection pin 611 and a second detection pin 612 that is coupled to one memory card dock 63 (the read/write interface of memory card). The first detection pin 611 is coupled to the pin in the dock 63 that first contacts with the metal pin of the memory card. In a preferred embodiment, the provided pin that first contacts with the metal pin of the memory card is a first ground pin 631 that is coupled to the Vss1 pin of the memory card. The second detection pin 612 is coupled to the pin in the memory card dock 63 that last contacts with the metal pin of the memory card. The pin that last contacts with the metal pin of the memory card should be a card detection pin 632 that is coupled to the memory card.

It should be noted that other memory card docks (not shown in the drawing) that are to be coupled to the card reader control chip 61 can also be implemented as the foregoing embodiment. According to the concept previously described FIG. 5, the control chip 61 of the card reader detects whether there is a second memory card inserting into another memory card dock by means of the first detection pin 611 when the control chip 61 is accessing a first memory card. According to the design of the pull up resistor 621, the voltage level of the first detection pin of the dock where the second memory card may insert would change from logic 1 to logic 0, indicating that another memory card is being inserted into a corresponding dock as the control chip 61 is accessing the first memory card. Since the first detection pin is coupled to the pin that first contacts with the metal pin of the memory card (such as the Vss), the control chip 61 can thereby detect the inserted second memory card before interference occurs, so as to eliminate errors.

Recalling the illustrations of FIG. 4, the card detection pin of the memory card is the pin that last contacts with the dock when the memory card is inserted. In other words, the card detection pin is also the pin that first detaches as the memory card is pulled out from the dock. According to the scheme as taught in the description of FIG. 3, the control chip 61 can detect whether the second memory card is being pulled out from the memory card dock while the control chip 61 is accessing the first memory card by means of the second detection pin 612. According to the design of the pull up resistor 622, the voltage level of the second detection pin would change from logic 0 to logic 1, indicating that another memory card is being pulled out from the dock as the control chip 61 is accessing the first memory card. Therefore, the control chip 61 can detect interference in an earlier stage, so as to perform an approach of error correction.

In the embodiments of the present invention, the control chip of the card reader can detect the presence of other memory cards before interference occurs. Even though only a few milliseconds (or probably less) are provided to react, it would be enough for the card reader control chip to carry out error corrections. For example, when the control chip detects a second memory card being inserted or pulled out when the first memory card is being accessed, the control chip can generate an interference-acknowledgement signal to stop or abandon the operation regarding the first memory card instantly. Furthermore, an error signal may be used as a reply to the computer or host that is coupled to the control chip. After that, the computer or host may re-access the memory card.

The object of the invention is to detect the interference that may occur among the memory cards in an earlier stage so as to perform error correction beforehand. Examples aforementioned are only embodiments that should not be limited therein.

While the invention has been described by means of a specification with accompanying drawings of specific embodiments, numerous modifications and variations could be made thereto by those skilled in the art without departing from the scope and spirit of the invention set forth in the claims.

What is claimed is:

1. A control chip of a card reader, wherein one or more pins of the control chip are shared between a plurality of memory card read/write interfaces, comprising:
    a first detection pin coupled to a first pin of a first memory card read/write interface, the first detection pin being configured to have an end that extends further than ends of remaining pins, so that the first detection pin is the first to contact a memory card in the first memory card read/write interface; and
    a second detection in coupled to a second in of a second memory card read/write interface, the second in being the last to contact a memory card in the second memory card read/write interface;
    wherein, the second detection in of the control chip is used to detect if any memory card is pulled out from the second memory card read/write interface;
    wherein, the first detection pin of the control chip is used to detect if any memory card is inserted into the first memory card read/write interface.

2. The control chip of claim 1, wherein the first pin coupled to the first detection pin is a Vss pin of the first memory card read/write interface.

3. The control chip of claim 1, wherein the second pin coupled to the second detection pin is a card detection pin of the second memory card read/write interface.

4. The control chip of claim 1, wherein the format for the first memory card read/write interface or the second memory card read/write interface is Compact Flash (CF), Micro Drive (MD), Secure Digital (SD), xD-Picture, Multi-Media Card (MMC), Memory Stick (MS) or Memory Stick Pro (MS-Pro).

5. The control chip of claim 1, wherein the format of the first memory card read/write interface and the format of the second memory card read/write interface are the same.

6. The control chip of claim 1, wherein the format of the first memory card read/write interface and the format of the second memory card read/write interface are different.

7. The control chip of claim 1, wherein first memory card read/write interface and the second memory card read/write interface are the same.

8. A method for detecting interference of a card reader control chip, wherein one or more pins of the control chip are shared between a plurality of memory card read/write interfaces, comprising:
    providing at least one first detection pin of the control chip for detecting if there is a memory card being inserted into one of the memory card read/write interfaces, wherein the first detection pin has an end that extends further than ends of remaining pins, so that the first detection pin is coupled to a pin that first contacts with the memory card;
    generating a first interference-acknowledgement signal to inform that the memory card inserted into one of the memory card read/write interfaces is processing data transmission when the control chip detects through the first detection pin that another memory card is being inserted into one of the memory card read/write interfaces; and
    detecting if there is one memory card being pulled out from one of the memory card read/write interfaces having at least one second detection in provided by the control chip, wherein the second detection in is coupled to a pin that last contacts with the memory card.

9. The method of claim 8, wherein the pin coupled to the first detection pin is a Vss pin of the memory card read/write interface.

10. The method of claim 8, further comprising:
    putting a halt to read or write processes of the memory card when the control chip generates the first interference-acknowledgement signal.

11. The method of claim 10, further comprising a step of:
    executing a process of rereading or rewriting of the memory card by a host coupled to the control chip.

12. The method of claim 8, further comprising a step of:
    generating a second interference-acknowledgement signal to notify that a memory card inserted into one of the memory card read/write interfaces is processing data transmission when the control chip detects through the second detection pin that another memory card is being pulled out from one of the read/write interfaces.

13. The method of claim 12, further comprising:
putting a halt to read or write processes of the memory card when the control chip generates the second interference-acknowledgement signal.

14. The method of claim 13, further comprising a step of:
executing a process of re-reading or re-writing of the memory cards by a host coupled to the control chip.

15. The method of claim 8, wherein the pin coupled to the second detection pin is a card detection pin of the memory card read/write interface.

16. A method for detecting interference of a card reader control chip, wherein one or more pins of the control chip are shared between a plurality of memory card read/write interfaces, comprising:
providing at least one second detection pin of the control chip for detecting if there is a memory card being pulled out from one of the memory card read/write interfaces, wherein the second detection pin is configured to have an end that extends less than ends of remaining pins, so that the second detection pin is the last to contact coupled to a pin that last contacts with the memory card; and
generating a second interference-acknowledgement signal to inform that the memory card inserted into one of the memory card read/write interfaces is processing data transmission when the control chip detects through the second detection pin that another memory card is being pulled out from one of the read/write interfaces.

17. The method of claim 16, wherein the pin coupled to the second detection pin is a card detection pin of the memory card read/write interface.

18. The method of claim 16, further comprising:
putting a halt to read or write processes of the memory card when the control chip generates the second interference-acknowledgement signal.

19. The method of claim 18, further comprising a step of:
executing a process of rereading and rewriting of the memory cards by a host coupled to the control chip.

* * * * *